(No Model.)
F. G. BURLEY.
SADDLE FOR BICYCLES.
No. 253,504. Patented Feb. 14, 1882.
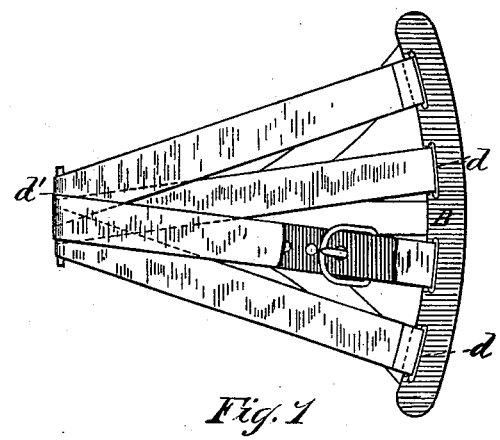
Fig. 1.
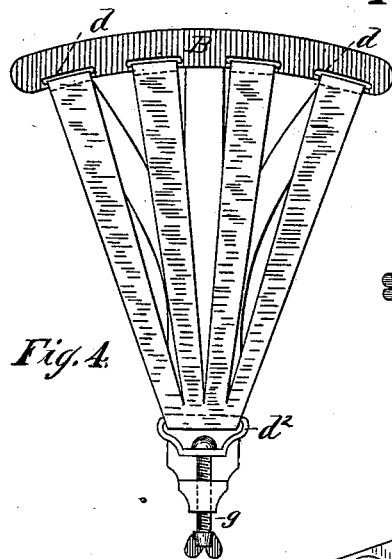
Fig. 4.
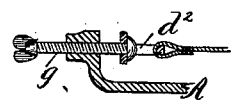
Fig. 5.
Fig. 2.
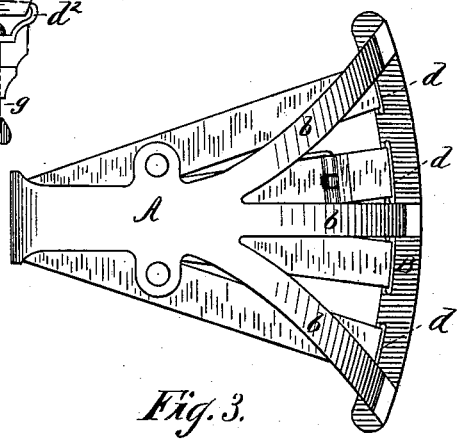
Fig. 3.
Attest:
O. W. Zittel
J. R. Snow
Inventor:
Franklin G. Burley
by J. E. Maynadier
his atty

UNITED STATES PATENT OFFICE.

FRANKLIN G. BURLEY, OF BOSTON, MASSACHUSETTS.

SADDLE FOR BICYCLES.

SPECIFICATION forming part of Letters Patent No. 253,504, dated February 14, 1882.

Application filed June 6, 1881. (No model.)

*To all whom it may concern:*

Be it known that I, FRANKLIN G. BURLEY, of Boston, in the county of Suffolk and State of Massachusetts, have invented a new and useful Saddle for Bicycles, of which the following is a full, clear, concise, and exact description, reference being had to the accompanying drawings, which form a part hereof.

Saddles for bicycles as made heretofore and in common use consist mainly either of a seat entirely metallic or of a sheet-metal frame covered with a leather pad. The iron saddle is objectionable because it is hard and unyielding. The stuffed saddles afford no ventilation, and in riding long distances the part of the body in contact with the saddle becomes highly heated.

The object of my invention is to furnish a flexible saddle for bicycles or like vehicles, easily adjustable, fitting itself to the form of the rider, and securing free ventilation.

My improved saddle consists of a metal frame adapted to be secured in any suitable manner to the bicycle or like vehicle, and having at one end a number of slots and at the other end one or more slots, with a series of strong straps of leather or the like passing through the slots and forming an open-work seat.

In the drawings, Figure 1 is a plan of a saddle embodying my invention. Fig. 2 is a side view, and Fig. 3 is an under plan view. Figs. 4 and 5 show a modification.

A is the body of the frame, preferably of wrought-iron or steel, turned up at the front and rear, as seen in Fig. 2. To secure lightness of the frame I prefer to make it with arms $b$, instead of solid. At the rear end of the frame is rigidly secured by rivets or other suitable means a cross-piece, B, with a number of slots, $d$. At the forward end is a slot, $d'$. The seat or body of the saddle consists of a series of straps, C, of leather or like material, passing alternately through the slots in the rear and forward ends of the frame. In order to draw it taut when the strap becomes stretched and loose, it may be made in two parts, with a buckle at the connecting ends; or there may be a series of independent straps, one for each slot, in the cross-piece A, each one furnished with a buckle.

It will be obvious that instead of a single slot at the front end of the saddle two or more slots may be used.

Instead of adjusting by means of a buckle or the like, the straps may be united at the forward end and attached to the movable piece $d^2$, as shown in Figs. 4 and 5, which movable piece is connected to the forward end of the frame A B by the set-screw $g$, by turning which the seat may be slacked or made taut as desired.

What I claim as my invention is—

The improved bicycle-saddle consisting of the base A, turned up at the front and having a cross-piece, B, at the rear, and having slots $d$ through cross-piece B, and a slot, $d'$, at the front, and the strap-seat C reeved through the slots, all as set forth.

FRANKLIN G. BURLEY.

Witnesses:
CHAS. H. CHAMPNEY,
DANIEL W. HYDE.